United States Patent [19]

Gehrke et al.

[11] Patent Number: 5,206,174
[45] Date of Patent: Apr. 27, 1993

[54] METHOD OF PHOTON SPECTRAL ANALYSIS

[75] Inventors: Robert J. Gehrke; Marie H. Putnam; E. Wayne Killian; Richard G. Helmer, all of Idaho Falls; Ronnie L. Kynaston, Blackfoot; Scott G. Goodwin, Idaho Falls; Larry O. Johnson, Pocatello, all of Id.

[73] Assignee: EG&G Idaho, Inc., Idaho Falls, Id.

[21] Appl. No.: 949,955

[22] Filed: Sep. 24, 1992

[51] Int. Cl.⁵ .................... G01N 23/00; G01N 23/223
[52] U.S. Cl. ...................................... 436/58; 378/45; 250/253
[58] Field of Search ............................ 436/58; 378/45; 250/253; 422/71

[56] References Cited

U.S. PATENT DOCUMENTS 3,792,276  2/1974  Toman et al. ...................... 250/369
4,456,823  6/1984  McFarland et al. ............. 250/252.1
4,582,670  4/1986  Leon et al. ........................ 376/245

*Primary Examiner*—James C. Housel
*Assistant Examiner*—N. Bhat
*Attorney, Agent, or Firm*—Alan D. Kirsch

[57] ABSTRACT

A spectroscopic method to rapidly measure the presence of plutonium in soils, filters, smears, and glass waste forms by measuring the uranium L-shell x-ray emissions associated with the decay of plutonium. In addition, the technique can simultaneously acquire spectra of samples and automatically analyze them for the amount of americium and γ-ray emitting activation and fission products present. The samples are counted with a large area, thin-window, n-type germanium spectrometer which is equally efficient for the detection of low-energy x-rays (10–2000 keV), as well as high-energy γ rays (>1 MeV). A 8192- or 16,384 channel analyzer is used to acquire the entire photon spectrum at one time. A dual-energy, time-tagged pulser, that is injected into the test input of the preamplifier to monitor the energy scale, and detector resolution. The L x-ray portion of each spectrum is analyzed by a linear-least-squares spectral fitting technique. The γ-ray portion of each spectrum is analyzed by a standard Ge γ-ray analysis program. This method can be applied to any analysis involving x- and γ-ray analysis in one spectrum and is especially useful when interferences in the x-ray region can be identified from the γ-ray analysis and accommodated during the x-ray analysis.

6 Claims, 3 Drawing Sheets

METHOD OF PHOTON SPECTRAL ANALYSIS

CONTRACTUAL ORIGIN OF THE INVENTION

The U.S. Government has rights in this invention pursuant to Contract No. DE-AC07-76ID01570 between the United States Department of Energy and EG&G Idaho, Inc.

FIELD OF THE INVENTION

This invention relates to a method of measuring and analyzing both an x-ray and a gamma-ray ($\gamma$-ray) spectrum from radionuclides in an unknown sample. In addition, during the acquisition of the spectrum, a pair of calibration pulser pulses are injected at the preamp at periodic intervals. The pulser pulses are processed in the same manner as x- and $\gamma$-ray pulses to monitor system quality.

BACKGROUND OF THE INVENTION

Rapid monitoring for transuranic contaminants during a buried waste retrieval process is a key to a successful campaign of buried transuranic waste retrieval. It is important to track the trend in level of soil contamination and smearable surface contamination to assess how well the spread of contamination is controlled to avoid exceeding safety and operating limits. Therefore, analysis techniques to monitor the presence of plutonium in soil, constant air monitor filters, and smearable surface contamination at the lowest levels of detection and the quickest time are mandatory.

The purpose of this particular invention is to disclose a method for the rapid assay of plutonium in soil by L x- and $\gamma$-ray counting techniques. The methods reported herein are intended to make an analysis technique available for routine use by employing equipment and instrumentation that is commercially available and by developing automated calibration, counting, and analysis techniques.

SUMMARY OF THE INVENTION

This invention discloses a method and apparatus for measuring the presence of plutonium in soils, smears, and filters by counting uranium L x-rays produced by the alpha decay of plutonium radioisotopes (usually $^{239}$Pu). The method involves accumulating both the x-ray and $\gamma$-ray spectrum in one count so that a spectrometer can simultaneously monitor for alpha and beta emitting radionuclides. Application of this apparatus with an automatic sample changer allows rapid and automated measurement of up to a hundred samples per day in a field-deployable environment. The field-deployable unit can be housed in a mobile trailer used for evaluating the status of contamination spread during buried transuranic waste retrieval.

This method and apparatus takes advantage of several advances that have occurred in Ge spectrometry, as follows:

1. detector crystals are now routinely produced with crystal diameters >60 mm and that have energy resolutions of full-width-at-half-maximum (FWHM) of <600 keV at 14 keV;

2. computer interfaced, 8192 and 16,384 channel analog-to-digital converters (ADC) with excellent pulse-height linearities, even with fixed conversion time, are commercially available;

3. precise monitoring of the spectrometer performance is now possible with advanced pulser technology;

4. high-speed, low-cost, and compact laboratory computers with megabyte size memories and large (>300 megabyte) hard disks, that can be interfaced to germanium (Ge) spectrometers, are in common use; and 5. germanium (Ge) spectrometer sample changers capable of holding 100 or more planchet-type samples and operated under computer control are commercially available.

The result is an analysis system and method that can be operated automatically 24 hours a day with a sample changer in a laboratory or mobile trailer with 110-V AC power and with a number of built-in quality checks to assure quality data and results.

Soil samples, sufficiently homogeneous for the current counting technique, are prepared by sieving and/or milling dry soil to reduce the maximum particulate size and thereby reduce photon attenuation variances from sample to sample. Sample containers are used that are a few millimeters larger in diameter than the detector crystal and are only a few millimeters in inside thickness. At present, a typical sample container is about 65-mm diameter by about 3-mm thickness and holds 10 to 15 grams (g) of soil.

The detector consists of a large (~60-mm diameter), thin-window, coaxial-type germanium (Ge) detector capable of efficiently measuring photon with energies ranging from 10 to 2000 keV. This type of detector not only allows measurement of x-ray emitting radionuclides (e.g., plutonium activity via the L x-rays) but also has the ability to detect $\gamma$-ray emitting radionuclides.

The spectrometer is equipped with a dual-energy pulser that is injected into the test input of a resistive feedback pre-amplifier. The pulser pulses are identified so that after being processed by the analog-to-digital converter, their channel address is digitally offset and routed to a region of the spectrum above, and isolated from, the sample photon spectrum. The pulser peaks are used to accurately monitor the gain (this allows correction for any gain or zero shifts) and system resolution, which must have long-term stability in order that the spectral fitting analysis techniques are to be successfully used. The pulser, with its associated software, is also capable of correcting for pulse pile-up when higher activity level samples are encountered.

The L x-ray and the $\gamma$-ray portions of the spectrum are analyzed separately. The $\gamma$-ray, or higher-energy portion, is automatically analyzed in the normal fashion with a $\gamma$-ray spectral analysis program, e.g., the VAX-GAP program. VAXGAP is a code developed at the Idaho National Engineering Laboratory (INEL) for routine analysis of $\gamma$-ray pulse-height spectra on a VAX computer. The lower-energy portion of the spectrum containing the L x-rays is automatically analyzed by fitting the spectrum with one or more anticipated components from prepared standard soil samples. The linear-least-squares fitting of the L x-ray region of the composite spectrum with its component spectra yields accurate results. The reduced $10_2{}^2$ and the uncertainties of the individual components are a measure of the quality of the fit. This analysis program is designed to require little operator intervention.

The shape of the sample container permits use of a commercially available planchet automatic sample changer with modifications to accommodate the larger diameter sample container, i.e., up to 70-mm diameter instead of a 50-mm diameter planchet. The results to date indicate that measurements of 100 pCi/g of $^{239}$Pu in soil can be made in a 15-minute count time with an accuracy of better than 15% (one estimated standard deviation). Detection limits of less than 50 pCi/g of plutonium in soil can be achieved in this count time. Application of this technique to other measurements of spectra containing both x- and γ-ray information (e.g., neutron dosimeter wires and foils) will be demonstrated in the future.

This analysis methodology consists of the hardware and software to acquire and analyze both high-energy-resolution x- and γ-ray spectral data with a Ge (one detector) spectrometer equipped with a dual-energy pulser with subsequent storage of the pulser data separate from the photon spectrum. Pulser pulses are processed through the pulse processing circuitry, digitally offset, and stored in a region above and separated from the photon (x and γ) spectrum. The functions of a dual-energy pulser are:

a) to provide a continuous measure of the energy scale of the entire spectrum (x- and γ-ray region);

b) to monitor the performance of the spectrometer by monitoring the full-width-at-half-maximum (FWHM) of the pulser pulses;

c) to measure and permit correction for pulse pile-up when high-activity level samples are counted; and d) to provide an accurately measured zero intercept and gain for each spectrum as measured by the precision pulser for the x- and γ-ray analysis programs. If the sample spectrum, due to drift, becomes gain or zero shifted relative to the previously acquired standardized x-ray spectral components, the spectrum can be automatically zero or gain shifted to realign the sample spectrum with the component spectra prior to performing the linear-least-squares fit.

Computer subroutines interpret the pulser data and, by a process of cross-correlating the pulser peaks with a unit Gaussian-shaped function, permit the pulser peaks to be analyzed as if they were γ-ray peaks. The dual-energy pulser is periodically calibrated with a radioactive source emitting γ-rays and x-rays whose energies are precisely known and span the energy range of interest (a source containing $^{57}$Co - 14, 122, and 136 keV, $^{60}$Co - 1173 and 1332 keV, and $^{137}$Cs - 661 keV was used for calibration). The pulser will maintain its energy calibration over a period of weeks to months.

Computer subroutines can also provide communication between the γ-ray and x-ray analysis programs to permit automatic inclusion or exclusion of certain spectral components (radionuclides) determined to be present or absent from analysis of the γ-ray portion of the spectrum. Inclusion or exclusion of these spectral components in the fitting of the x-ray region can significantly improve the accuracy and precision of the x-ray results.

Quality-assurance checks are provided separately by the γ-ray analysis program (reported uncertainties in the energies and emission rates, and the confidence level of the radionuclide identification), the spectral fitting of the x-ray region (the uncertainties in each x-ray component and the quality of the least-squares fit), and the pulser with its analysis program (variation, as a function of time, in the measured energy scale, and in the width of the pulser peaks). When a radionuclide can be analyzed from both the x- and γ-ray analysis programs, the results may be compared, e.g., the 59 keV γ-ray and the L x-rays from $^{241}$Am decay can provide a documented set of internally verified analysis data.

This method has application to any spectral acquisitions and analysis that contains useful and complimentary information in both the x-ray and γ-ray regions of a spectrum. Some examples of this method of analysis are:

a) analysis for uranium or plutonium in soils, sludges, air filters, smears, etc. from waste streams or contaminated soils that may also contain activation and fission products;

b) instrumental neutron and particle activation analysis of samples that contain, in addition to γ-ray-emitting radionuclides, radionuclides that emit higher levels of x-rays relative to their γ-ray emission (e.g., certain rare earth elements); and c) analysis of $^{93m}$Nb and other x-ray emitting flux monitors containing impurities, e.g., $^{94}$Nb and $^{182}$Ta, that must be considered if large analysis uncertainties or errors are to be avoided.

The analysis method that uses a photon spectrometer generally stated comprises the steps of:

preparing a plurality of unknown activity samples of the medium within sample containers;

preparing a set of calibration samples consisting of samples having known activities of high-purity radionuclides and a clean background sample measuring response spectra of the calibration samples with a Ge spectrometer;

measuring the radionuclide activities or activity concentrations from the spectra associated with the plurality of unknown activity samples;

injecting a low- and high-energy pulse into a spectrometer preamplifier circuit while accumulating the above spectra thereby providing an energy calibration signal at a periodic interval;

analyzing a γ-ray energy region of spectra from the unknown activity samples using a non-linear peak-fitting function;

analyzing an x-ray energy region of the spectra from the unknown activity samples using a linear-least-squares spectral fitting method by fitting the spectra of the plurality of unknown activity samples with the response spectra of the calibration samples;

computing and displaying a Chi-square number and a "quality of fit" value of the x-ray region data wherein a quality-of-fit value (also referred to as the reduced Chi-square) of less than two (2) indicates a good correlation with known samples and a value greater than two (2) indicates a poor correlation with the known samples;

displaying the quality-of-fit value and a calculated channel-by-channel residual when the quality-of-fit value is greater than two (2); and displaying an activity value for each nuclide.

Other objects, advantages, and capabilities of the present invention will become more apparent as the description proceeds.

DETAILED DESCRIPTION OF THE INVENTION

Figure 1:
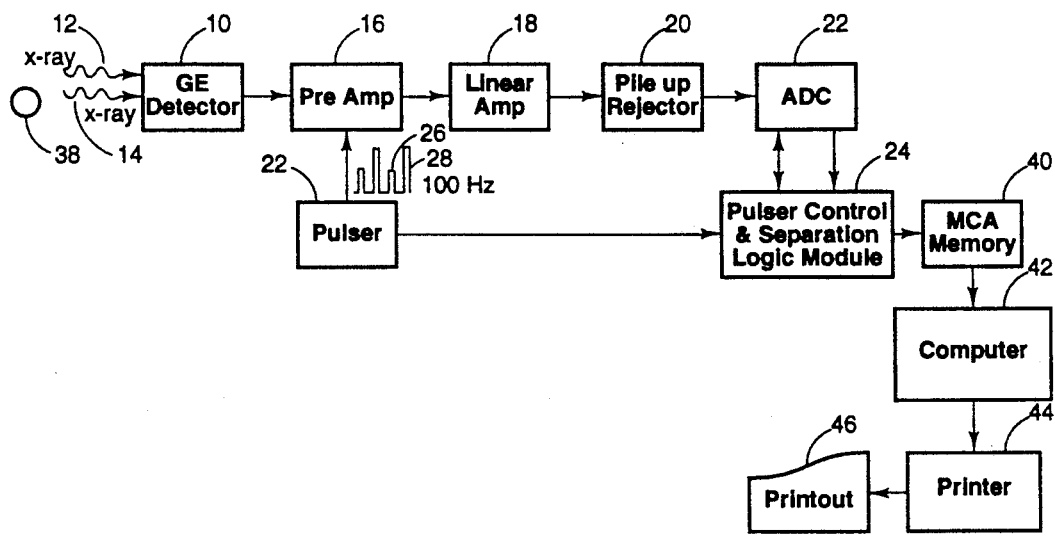
FIG. 1 is a block diagram flow chart of the inventive method.

FIG. 1 is a block flow diagram of the inventive method and system of the x-ray and γ-ray spectrum analyzer. The detector 10 signal inputs to a preamplifier 16 and linear amplifier 18. A pulse pile-up rejector 20 may be installed when high count rates are anticipated. The pulse signal is converted from analog to digital by the ADC 22. A pulser equipped ADC has been designed and demonstrated for a Canberra model No. 8076 and a Nuclear Data model No. ND580 series.

The detector 10 consists of a large area (60-mm dia.), thin window, coaxial-type Ge detector capable of efficiently measuring photons (x and γ rays) 12 and 14 with energies ranging from about 8 keV to greater than 2000 keV. This type of detector not only allows measurement of plutonium and americium activities via emitted L x-rays and $^{241}$Am via either its L x-rays and 26-keV γ-ray or the 60-keV γ-rays but is also capable of efficiently detecting γ-rays from other radionuclides.

Figure 2:
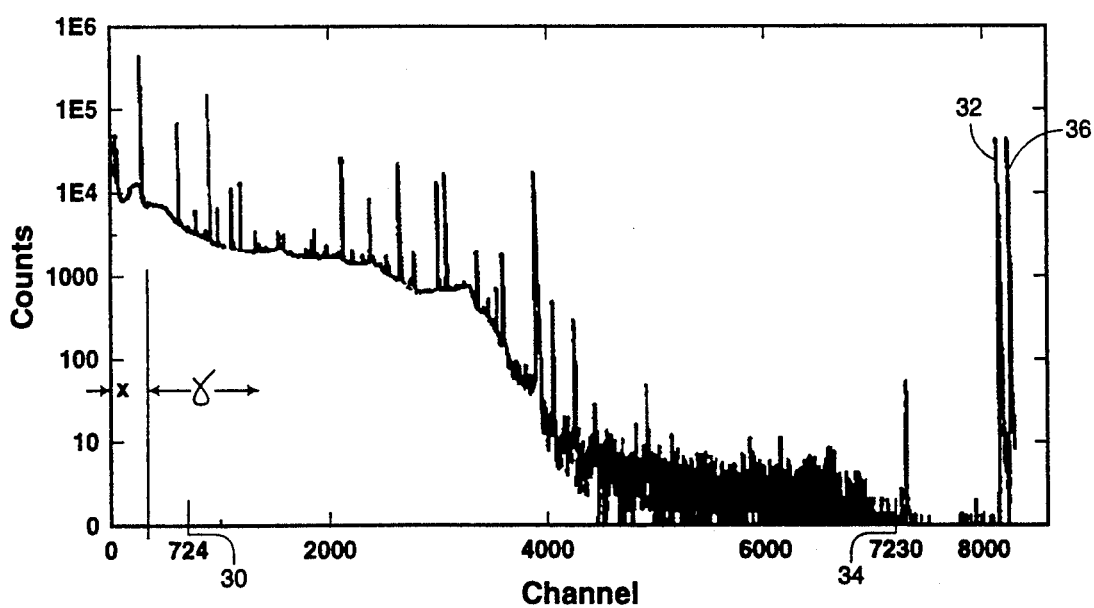
FIG. 2 is a graph of the multichannel x-ray and γ-ray spectrum including the calibration pulses.

The spectrometer is equipped with a dual-energy pulser 22 that injects periodic rectangular-shaped pulses into the test input of the resistive feedback pre-amplifier 16, as determined by a pulser control and separation logic 24. The pulser has been developed over a 20-year time frame by EG&G Idaho, Inc. The pulser is a miniaturized control package about $2''\times 1''\times \frac{1}{4}''$ and is disclosed in U.S. Pat. No. 4,968,889 having a common assignee with the instant disclosure. The pulser operates at about 100 Hz (50 Hz each) and in the application described herein emits a first lower-energy pulse 26 of ~12 keV and a higher-energy pulse 28 of ~1330 keV, as controlled by logic module 24. The lower- and upper-energy pulser pulses 26 and 28 are time tagged so that after being processed by the ADC 22 their channel addresses are increased by addition of respective constants to route them to regions of the spectrum above, and isolated from, the photon spectrum, as shown in FIG. 2. As shown in the example spectrum of FIG. 2 (from another pulser application), the lower-energy pulse channel has been increased from channel 724 at 30 by the offset of 7312 to channel 8036 at 32. Similarly, higher-energy pulse 34 at 7230 has been increased to channel 8124 at 36 by the offset of 894. These offset calibration pulses are beyond the γ-energy range. The positions of the pulser peaks, together with their previously measured energy equivalent, are used to determine two parameters (a and b) of the energy-channel relationship of equation (1):

$$E(x)=a+bx+cx^2 \qquad \text{Eq.(1)}$$

where
E(x) = photon energy
a, b, and c = constants
x = channel position.

Similarly, the width of a Gaussian peak in channel x of the calibration standard spectrum is determined by the following equation:

$$w(x)_c = w_0 + dx \qquad \text{Eq.(2)}$$

where
$w(x)_c$ = width at channel x $w_0$ = width at channel zero
d = constant.

The γ-ray peak widths for sample spectra $[w(x)_s]$ are determined with the following equation:

$$w(x)_s = \{[(W_{pi})^2 - (W_{pc})^2] + [w_0 + dx]^2\}^{\frac{1}{2}} \qquad \text{Eq.(3)}$$

where
$W_{pi}$ = pulser width for the sample spectrum
$W_{pc}$ = pulser width for the calibration spectrum.

The ratio of the area of a pulser peak to the number emitted by the pulser gives the correction for pulse pile-up or random summing.

The output from the separation logic module 24 with the digital pulse counts from the sample 38 is processed by the multichannel analyzer (MCA) 40 which stores the data until completion of a typical count time.

Data is further analyzed in computer 42 where the γ-ray data is analyzed using a spectral analysis program, i.e. VAX Gamma-Ray Analysis Package (VAXGAP). Information from the γ-ray analysis, that may be useful in determining any additional x-ray components needed for the x-ray spectral analysis, is furnished to the x-ray analysis program. The x-ray data is analyzed using a linear-least-squares method to determine Chi-squared ($\chi^2$), quality-of-fit value, residuals and activity (or activity concentration) for each spectral component. Data is printed on computer printer 44 at printout 46.

Sample Preparation. Soil samples are prepared by a radiochemist by sieving and/or milling dry soil to reduce the maximum particle size to less than <200 mesh (i.e., <0.074 mm). The effects of "hot" particles within the sample are reduced by the relatively large sample (i.e., relative to typical radioanalytical sample sizes of <1 g) and by the sieving and/or milling process. By use of a large area Ge detector in combination with a thin sample container, an average transmission out of the sample of about 40% for uranium L x-rays can be achieved. Sample containers with a diameter of 65 mm are used; they are a few millimeters (mm) larger in diameter than the detector crystal (~60-mm). The thickness of the sample container is 3 to 5 mm to balance the opposing effects of the sample size and the variance in attenuation from sample to sample. There are two sizes of sample containers: one with a 65-mm inside diameter and a 5-mm inside depth, and the other with the same inside diameter but a 3-mm inside depth. Initially, a spacer was made from aluminum stock (65-mm diameter by 2-mm thickness) so that data could be acquired for a 3-mm thick sample using the 5-mm deep container containing the spacer when the 3-mm deep container had not been produced. The sample containers are made of either acrylonitrile butadiene styrene (ABS) or polymethyl penetene (TPX) plastic. The lid, through which the sample is counted, is less than 1-mm in thickness. The 3-mm deep sample container holds approximately 12 grams of sieved soil and the 5-mm deep sample container holds approximately 20 grams. The soil is loaded into a sample container by partially filling the container with soil and lightly tapping the container on a hard surface to settle it; this process is repeated until the container is full. A straight edge may be lightly drawn over the top surface of the soil prior to covering it with a lid to remove excess soil and level it. This procedure provides a reproducible method of loading the sample container and reduces the amount of settling of the soil sample inside the container over time.

The linear-least-squares spectral fitting technique has been applied in this present method to the analysis of the L x-ray region of the spectra. This technique consists of measuring the spectral response of the detector for single (pure) radionuclides anticipated to be in the unknown sample, i.e., in the case of plutonium several Pu isotopes are actually present in the component. The number of radionuclide components, m, is not limited by the mathematics but, as a practical matter, should not exceed about five. These response functions (spectra) can be normalized to correspond to a specific number of decays of the radionuclide or $^{239}$Pu "equivalent" in the case of plutonium. When a spectrum of an unknown sample has been acquired, these individual spectral components are combined by linear-least-squares fitting to determine the contribution of each component. The following equations are used to solve for "$S_j$", the standardization coefficients. That is, in the following equation the standardization coefficients, $S_j$, are determined which minimize the sum of the squares of the residuals. Here, $R_{ij}$ are the response spectrum functions, and $N_i$ are the counts in channel i in the spectrum from the unknown sample.

$$R^2 = \sum_{i=L}^{i=U} W_i \left( N_i - \sum_{j=1}^{j=m} R_{ij} S_j \right)^2 \quad \text{Equation 4}$$

$W_i$ is the weighting factor for channel i of the spectrum from the unknown sample and is normally the square of the estimated inverse standard deviation or $1/N_i$. L and U are the lower and upper channel limits over which the linear-least-squares spectral fit is performed.

At the minimum of $R^2$, we have m equations of the form:

$$dR^2/dS_j = 0 \quad \text{Eq.(5)}$$

and
$$\chi^2 = R^2$$
where
j = 1,m and
$\chi^2$ = Chi-square.

The information regarding the contribution of each component, in the case of actinide analysis, is contained in the energy region between about 10 and 30 keV [channels 40(L) to 256(U)]; only this portion of the unknown spectrum is fitted by linear least squares. In this way, the sensitivity and accuracy of the fit is optimized. Further, since an uncertainty is deduced for each standardization coefficient, $S_j$, and a Chi-square ($\chi^2$) is reported, the quality of fit can be easily assessed. The quality of fit equals $\chi^2$/(degrees of freedom). If the quality of fit is poor, e.g., greater than 2.0, the fit can be redone with more or fewer component spectra, with a different set of calibration spectra (component spectra) that better represents the sample matrix, or with the response spectra after gain or zero shifting the unknown spectrum.

Figure 3:
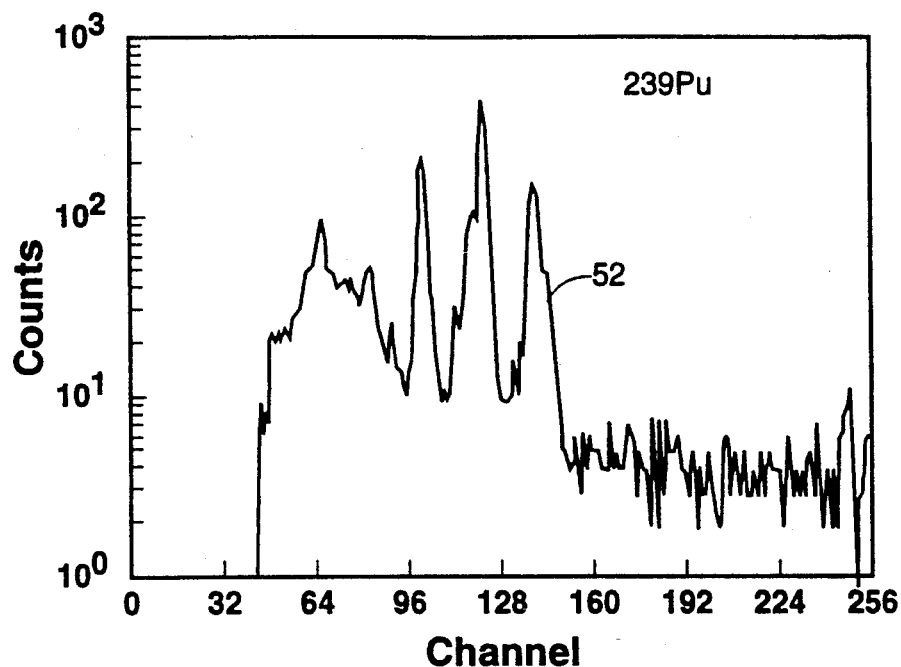
FIG. 3 is an L x-ray spectrum from a pure plutonium standard sample.
Figure 4:
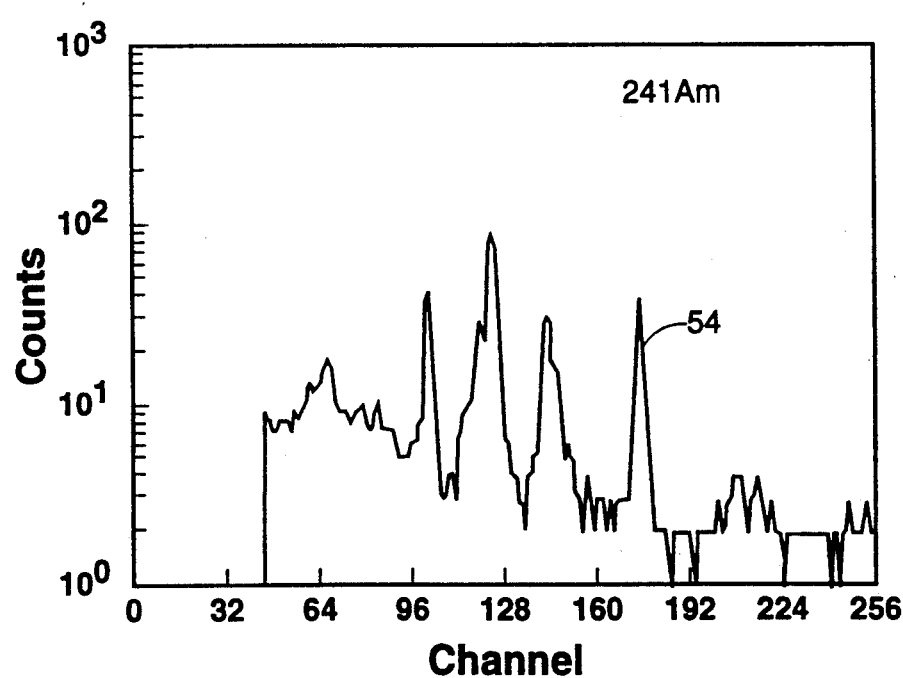
FIG. 4 is an L x-ray spectrum from a pure americium standard sample.

Measurement of L x-Ray Response Spectra. Measurement of the L x-ray response spectra for plutonium and americium involved the preparation of a set of three "standard" samples of clean soil having a consistent composition and simulating the composition of the unknown samples to be analyzed. If different types of soil samples (density, elemental, or Pu isotopic composition) are anticipated, additional sets of response spectra shall be obtained. The three calibration samples within each set consisted of an unspiked (no added radionuclides) sample, a sample spiked uniformly with a known activity of high purity Pu (1000 pCi/g of $^{239}$Pu equivalent), and one spiked with a known activity of high purity $^{241}$Am (1000 pCi/g). Depending upon the samples being analyzed, other x-ray spectra of interfering radionuclides may be included as component standards (response spectra). After installation of the spectrometer, individual spectra of each calibration standard from each set were acquired for a known time (~10,000 seconds) and at the same energy scale. These spectra provide spectral shapes and intensities for known amounts of radionuclides plutonium and americium present as shown in FIGS. 3 and 4. Sufficient statistics in each calibration spectrum were acquired so that the associated statistical uncertainty can be considered negligible relative to the statistical uncertainty of the "unknown" sample spectra. This is accomplished by using extended count periods. The energy scale for each spectrum is measured by the dual-energy pulser peaks present in each spectrum and (if necessary) the energy scales are adjusted prior to analysis to make them all the same.

L x-Ray Calibration for Plutonium and Americium. After establishing a file of response spectra (i.e., $^{239}$Pu, $^{241}$Am, and background), a calibration curve may be prepared. Spectra of other "mixed" standards containing known activities over the range of interest for Pu ($^{241}$Am also is in samples) are acquired for known times and at the same energy scale as used to acquire the response spectra. The activity for each radionuclide as a function of standardization coefficients, $S_j$, can be calculated as shown in Equation 6:

$$A_j = F_j S_j A_s \quad \text{(solve for } A_j\text{)} \quad \text{Eq.(6)}$$

where
$F_j$ = the standardization factor (for different counting times)
$A_j$ = the activity of radionuclide j
$A_s$ = the activity or normalized activity of the response spectrum
$S_j$ = standardization coefficient from least-squares fit of Equation 4.

If the response spectra are normalized to a specific activity, then $F_j$ simply normalizes the spectra for different counting times.

Figure 5:
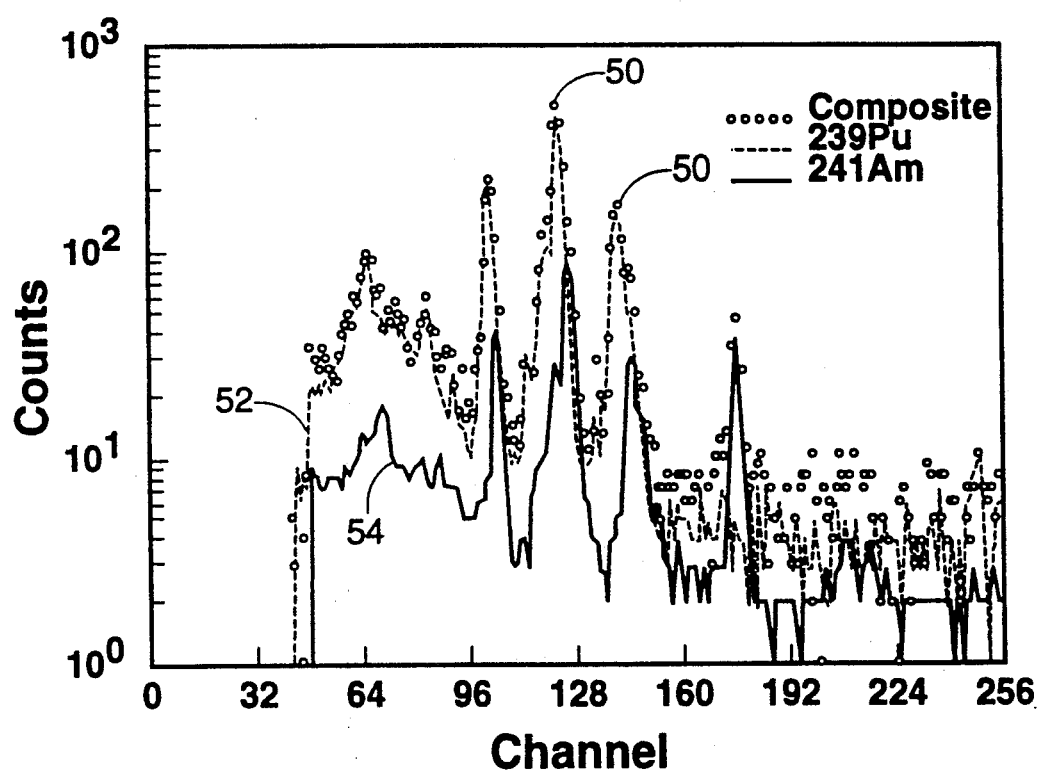
FIG. 5 is a composite unknown sample L x-ray spectrum with the standard americium and plutonium sample component spectral contributions also shown.

FIG. 5 shows a spectrum from a "mixed" (plutonium and americium) standard of plutonium in soil with the least-squares fit results overlaid. The sum of squares value $\chi^2$, if a low number, indicates a good fit as opposed to higher numbers indicating a poor fit and possibly one or more missing components spectra or a significant difference in the component and composite spectra due to differences in energy resolution or peak shape.

The composite data 50 is data from a prepared sample of the "mixed" (and known radioactivity) standard sample. Spectrum 52 is from the pure plutonium calibration standard, and spectrum 54 is that from the pure americium standard. It can be determined by visual inspection that the peaks of spectrum 52 and 54 at each channel approximates the composite 50 spectrum peaks.

In FIG. 5, the background radioactivity was not subtracted from the composite spectra data nor each pure calibration spectra. Therefore, in the least-squares process, the background component was negative and is not shown in FIG. 5. (Normally, the background is subtracted from the component spectra prior to their storage as components since the background associated with an unknown sample may be different in shape or activity from that of the components. Under these conditions, the background will appear as a positive component in the fitting process.)

The Chi-square divided by the degrees of freedom is a measure of the quality of the least-squares spectral fit and should lie below 2.0 as is the case for the spectrum in FIG. 5.

Experimental Sample Acquisition and Analysis. Samples that were treated as unknown amounts of plutonium, americium, and other x-ray and γ-ray emitting radionuclides were prepared and counted in the same manner as the calibration samples and "mixed" standards but were counted for shorter times. The spectra were fitted with the response spectra in the same manner as with the "mixed" standard except the measured standardization coefficient, $S_j$, was related to activity through the normalization factor, $F_j$, as shown in Equations 5 and 6. If a poor quality of fit (e.g., greater than 2) is encountered, then the source of the poor fit should be investigated. In some cases, as indicated above, a new calibration source set may need to be prepared if the unknown sample matrix is different than that of the existing calibration set.

In order to determine the accuracy achievable with this method, "mixed" standards of plutonium containing 103 pCi/g of $^{239}$Pu and a smaller amount of $^{241}$Am were prepared, counted, and analyzed as if they were samples. The results from 900-second and 1800-second counts and the lower limit of detection (LLD) are presented in Table 1. Note that plutonium activity levels as low as 103 pCi/g can be measured in the presence of 4 pCi of $^{241}$Am per gram of soil to an accuracy of 13% in a 900-second count.

TABLE 1

| Measured $^{239}$Pu Activity Concentrations In Soil (Mixed Standards) | | | |
|---|---|---|---|
| Count Time, seconds (s) | Activity Concentration (pCi/g) | | Projected LLD (pCi/g) |
| | Actual | Measured | |
| 900 | 103.0 ± 1.4 | 111 ± 14(13%) | 42 |
| 1800 | 103.0 ± 1.4 | 98 ± 11(12%) | 33 |

Detection Limits and Quality Assurance. The method outlined by L. A. Currie ["Analytical Chemistry", 40 (1968) p. 586] for the determination of lower limits of detection (LLD) that meet specific statistical criteria is in wide use and is recommended here. However, since several radio-nuclides and their associated spectral components overlap and contribute to a sample spectrum, none of the regions of interest are free of interferences. Therefore, in this application, the detection limits for plutonium and americium in soil are most easily determined by relating them to the estimated standard deviation in the measured activity.

When the number of counts in the energy region of interest of the background spectrum is greater than about 42 counts (over 50 counts are in the energy region of interest in background spectrum for a 900 second count time), simple "working" expressions may be stated for the detection limit as defined by Currie. When the uncertainty in the standardization coefficient, which relates the amount of a component present to the activity, is $(\sigma_b/S)100 = 30.4\%$ ($\sigma_b$ is the standard deviation of the clean (blank soil) sample and S is the net signal), the amount of component present is considered to be at the detection limit, LLD. The LLD values as reported in Table 1 have been deduced based upon measured activities and associated uncertainties for real samples whose activities are within a factor of two or three of the deduced detection limit.

One advantage that the dual-energy pulser will provide is an accurate energy calibration for all spectra. This energy calibration is especially valuable for those spectra associated with radionuclides emitting only one photon or with all photons grouped within a small energy range (e.g., x-rays from an element). As a result, all linear-least-squares fitting can be performed at essentially the same energy scale since the x-ray spectra can be shifted to that scale. The pulser not only will provide an energy calibration it also will provide a measure of the detector resolution. If a detector begins to deteriorate or noise enters the system, it is observed in the measured width of the pulser peaks. Further, correction for pulse pile-up, although not anticipated when counting environmental level 10 samples, can be automatically applied from information in the pulser peaks, i.e., ratio of pulser pulses counted divided by pulser pulses injected during the count time. These features of the pulser will provide excellent quality control for data acquired by this spectrometer system.

Information on the quality of the results from the linear-least-squares fit is provided by the quality of fit and the channel-by-channel residuals that are provided. Channel-by-channel residuals are equal to the differences between the measured counts and the sum of the counts of the components for each channel (see Equation 4). Table 2 is a printout showing the raw standardization coefficients and the quality-of-fit (QF) value resulting from a fit. The QF value of 1.26 indicates that: (a) a high-quality fit has been achieved and that all significant spectral components were represented in the fit; (b) that the energy scale was satisfactory; and (c) that sample matrices of standards and unknown samples were similar. In cases where the quality-of-fit value is large, a printout of the channel-by-channel residuals between the one sample spectrum and the sum of the component spectra allows the operator to identify spectral regions in which the fit is poor and address the cause. All of the above analysis features contribute to ensuring the quality of the least-squares spectral fitting process and the resulting measured activities.

TABLE 2

| Intensities for a 1800 s Live-Time Count of 12 g soil sample. | | | | | |
|---|---|---|---|---|---|
| Spectrum | $S_j$ | Standard Deviation | Nuclide | Measured Activity (pCi/g of soil) | Detection Limit (pCi/g of soil) |
| Composite | | | | | |
| Standard | 0.00267882 | 0.00068745 | $^{241}$Am | 3.97 ± 26% | not determined |
| Standard | 0.01349531 | 0.00155421 | $^{239}$Pu | 98 ± 12% | 33 |
| Standard | 0.07446890 | 0.00978765 | background | | |

Degrees of Freedom (DF) = 97, Quality of Fit (QF) number = 1.259, the Sum squares residuals = 122 = $X^2$, where QF = $X^2$/DF.

The L x-ray spectrum measurement technique presented herein has been demonstrated to have the capability to analyze ~12 g soil samples contaminated by plutonium down to 50 pCi/g for count times as short as 15 minutes (900 seconds). Spectral fitting of the sample spectra with response spectra permit this process to be performed automatically with built-in quality-assurance checks. Analysis of γ-ray emitting radionuclides is achieved by the use of a γ-ray spectral analysis package on the upper portion of the same photon spectrum as accumulated for the L x-ray spectrum. It is believed that this technique can be expanded to the analysis of a variety of other x-ray and γ-ray emitting samples (e.g., flux monitors), samples contained on filter paper (e.g., particulate material on air filters), and from different waste forms (e.g., glass). With modifications, this system can be incorporated into a portable, battery-powered, in-field instrument.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A method for measuring and analyzing an x-ray and γ-ray spectrum of radionuclides in a medium by a spectrometer, comprising the steps of:
   a. preparing a plurality of unknown activity samples of the medium within sample containers;
   b. preparing a set of calibration samples consisting of known activity samples of high purity radionuclides and a clean background sample;
   c. measuring response spectra of the calibration samples with the spectrometer;
   d. measuring the radionuclide activities or activity concentrations from the spectra associated with the plurality of unknown activity samples;
   e. injecting a low-energy and a high-energy pulse into a spectrometer preamplifier circuit while accumulating the above spectra thereby providing an energy calibration signal at a periodic interval during steps c. and d.;
   f. analyzing a γ-ray region of the spectra from the unknown activity samples using a non-linear peak fitting function;
   g. analyzing an x-ray region of the spectra from the unknown activity samples using a linear-least-squares spectral-fitting method by fitting the spectra of the plurality of unknown activity samples with the response spectra of the calibration samples;
   h. computing and displaying a Chi-squared number and a quality-of-fit value of the x-ray region data wherein a value less than two (2) indicates a good correlation between the unknown activity samples and the known activity samples, and a value greater than two (2) indicates a poor correlation between the unknown activity samples and the known activity samples;
   i. displaying the quality-of-fit value and a calibrated channel-by-channel residual when the quality-of-fit value is greater than two (2); and
   j. displaying an activity value for each nuclide.

2. The method as recited in claim 1 wherein the medium is a soil sample having traces of plutonium and americium.

3. The method as recited in claim 2 wherein a time for measurement of the sample response spectra is between 15 and 30 minutes.

4. The method as recited in claim 3 wherein a frequency of both injected energy pulses is about 100 Hz.

5. The method as recited in claim 4 wherein the low-energy pulse is about 12 keV and the high-energy pulse is about 1330 keV.

6. The method as recited in claim 5 wherein the activity value of the sample is less than 50 pico-Curies per gram.

* * * * *